(12) United States Patent
Thetford et al.

(10) Patent No.: US 10,358,560 B2
(45) Date of Patent: Jul. 23, 2019

(54) MODIFIED POLYACRYLATE DISPERSANTS FOR THE DECORATIVE CERAMIC MARKET

(71) Applicant: Lubrizol Advanced Materials, Inc., Cleveland, OH (US)

(72) Inventors: Dean Thetford, Rochdale (GB); Elliot Coulbeck, Bury (GB)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 113 days.

(21) Appl. No.: 15/564,568

(22) PCT Filed: Apr. 8, 2016

(86) PCT No.: PCT/US2016/026554
§ 371 (c)(1),
(2) Date: Oct. 5, 2017

(87) PCT Pub. No.: WO2016/164662
PCT Pub. Date: Oct. 13, 2016

(65) Prior Publication Data
US 2018/0072891 A1    Mar. 15, 2018

Related U.S. Application Data

(60) Provisional application No. 62/145,741, filed on Apr. 10, 2015.

(51) Int. Cl.
| | | |
|---|---|---|
| *C09D 11/037* | (2014.01) | |
| *C09D 11/107* | (2014.01) | |
| *C09D 11/322* | (2014.01) | |
| *C09D 11/36* | (2014.01) | |
| *C09C 1/00* | (2006.01) | |
| *C09C 3/00* | (2006.01) | |
| *C09B 67/46* | (2006.01) | |
| *C09D 11/10* | (2014.01) | |
| *C09D 11/326* | (2014.01) | |
| *C08L 33/04* | (2006.01) | |
| *C08L 33/18* | (2006.01) | |
| *C08L 33/24* | (2006.01) | |
| *C09D 7/45* | (2018.01) | |
| *C01B 13/00* | (2006.01) | |

(52) U.S. Cl.
CPC ............ *C09B 67/009* (2013.01); *C08L 33/04* (2013.01); *C08L 33/18* (2013.01); *C08L 33/24* (2013.01); *C09D 7/45* (2018.01); *C09D 11/10* (2013.01); *C09D 11/326* (2013.01); *C01B 13/00* (2013.01); *C09C 1/0081* (2013.01)

(58) Field of Classification Search
CPC ... C09D 11/037; C09D 11/107; C09D 11/322; C09D 11/36; C09C 1/0009; C09C 1/0081; C09C 3/006
See application file for complete search history.

(56) References Cited

U.S. PATENT DOCUMENTS

| | | | | |
|---|---|---|---|---|
| 2013/0342593 | A1* | 12/2013 | Fornara | C08G 69/44 347/2 |
| 2014/0024749 | A1* | 1/2014 | Shooter | C08F 220/06 524/90 |
| 2014/0288227 | A1* | 9/2014 | Thetford | C09D 17/002 524/502 |

FOREIGN PATENT DOCUMENTS

| | | | | |
|---|---|---|---|---|
| WO | 2015/035107 A1 | 3/2015 | | |
| WO | WO-2015035107 A1 * | 3/2015 | ............ | B01F 17/005 |

OTHER PUBLICATIONS

Search Report of Corresponding International Application No. PCT/US2016/026554 dated Jul. 4, 2016.
Written Opinion of Corresponding International Application No. PCT/US2016/026554 dated Jul. 4, 2016.

* cited by examiner

Primary Examiner — Vu A Nguyen
(74) Attorney, Agent, or Firm — Samuel Laferty; Teresan Gilbert

(57) ABSTRACT

The invention provides dispersed inorganic mixed metal oxide pigment compositions in a non-aqueous media utilizing a dispersant having terminal end groups and a central portion of the structure —[CH(A)-C(B)(D)]n-[CR$_2$CR$_2$]m- to disperse a mixed metal oxide pigment in the media. The metal oxide pigment is of the type used to color ceramic or glass articles. A milling process using beads is also described to reduce the mixed metal oxide particle size to the desired range. A method of using the mixed metal oxide dispersion to digitally print an image on a ceramic or glass article using the dispersion jetted through a nozzle and subsequently firing the colored article is also described.

18 Claims, No Drawings

MODIFIED POLYACRYLATE DISPERSANTS FOR THE DECORATIVE CERAMIC MARKET

CROSS REFERENCE TO RELATED APPLICATION

This application is a national phase entry under 35 U.S.C. 371 of PCT/US2016/026554 filed Apr. 8, 2016, which claims the benefit of U.S. Provisional Application No. 62/145,741 filed Apr. 10, 2015.

FIELD OF INVENTION

The dispersants and dispersed mixed metal oxide pigment compositions are useful for the colouration of ceramic articles and glass. The dispersed pigments are those of the type that develop their colouration during high temperature ceramic firing of a coating on the ceramic article or glass. The dispersed pigments are desirably suitable for jetting through a nozzle during a digitally controlled printing operation. The dispersants are polyacid polymers functionalized with poly(alkylene oxide) side chains through reactions of a terminal hydroxyl or amine group of the poly(alkylene oxide) with carboxylic acid group(s) of the polyacid polymer.

BACKGROUND OF THE INVENTION

Civilizations have made a variety of ceramic articles such as cooking and serving vessels, water and other fluid containers, tiles, bricks, etc., for thousands of years. These were typically coloured or decorated with metal oxide type pigments that developed colours or more intense colours during an elevated temperature firing of the pigment and ceramic article. The metal oxide type colouration pigments were thought to chemically interact and interpenetrate and develop colours at high temperatures with the ceramic composition and/or with more glassy compositions sometimes applied with the colouration pigments or subsequently applied. The more glassy compositions were often to provide impermeable or barrier properties to the outer surface of the ceramic article (to protect the ceramic article from environmental materials with which it might come into contact).

With conventional organic pigments and the few inorganic pigments (e.g., $TiO_2$, silica, and talc) in polymeric organic binder, the particle size and particle uniformity are very important to achieve consistent and intense colouration. Inorganic mixed metal oxide pigments used in inorganic ceramic colouration are generally not as well understood as organic pigments. The particle size of the inorganic metal oxide pigments generally has not been studied and controlled to the extent that particle sizes of pigments has been controlled for use in polymeric organic coatings and inks.

WO2012/107379A1 is directed to a aminic dispersant with poly(oxyalkylenecarbonyl) solubilizing chain and WO2012/116878A1 is directed to ceramic ink for inkjet printers utilizing a dispersant from polyethyleneimine with homo or copolymers based on lactic acid.

WO2014/146992 is directed to inks for inkjet printers prepared by milling a ceramic inorganic pigment in the presence of a dispersing agent which is the reaction product of polyethyleneimine and a co-polyester of 12-hydroxystearic acid and ε-caprolactone. WO2015/035107 is directed to a dispersant comprising a polyacrylic copolymer functionalized with a polyether and reacted with an aminic polybasic species.

SUMMARY OF THE INVENTION

The coloration of ceramic tiles (such as bathroom tiles) has for many years been done by screen printing and gravure printing techniques and primarily using water based formulations, traditional electrostatic dispersants were sufficient for these formulations. With interest in converting from older printing technologies such as screen and gravure printing to digitally printing on ceramic articles using ink jet nozzle technology, there is also a need to reduce the particle sizes of inorganic metal oxide pigments and to stabilize colloidal particles of inorganic metal oxides in ink jet inks to avoid settling of the denser mixed metal oxide pigments and plugging of ink jet nozzles.

More recently the industry has shifted away from traditional printing methods and is using digital printing instead. In digital formulations, a much wider range of solvents systems with different polarities are used, from aliphatic all the way to water. These formulations also require more sophisticated dispersants in order that they meet all the requirements needed to be jetted using a digital printer. While many pigments for conventional coatings or inks tend to be organic and have densities within 10 or 20 wt. % of the continuous media, mixed metal oxide pigments can have densities of 2 to 4 times that of the continuous phase, making such mixed metal oxide pigments much harder to keep dispersed as colloidal particles in an organic media.

A dispersant for mixed metal oxides has been identified as a polyacid polymer reacted with hydroxyl or amine terminated poly(alkylene oxide) to create a comb polymer dispersant structure with the teeth of the combs being derived from the ester, amide, or imide forming reactions of carboxylic acid groups of the polyacid with the terminal hydroxyl or amine groups of the poly(alkylene oxide). The polyacid polymer has from about 10 to about 1540 repeat units in the backbone. The teeth of the combs are present on about 15 to 85 mole % of the acid groups of the polyacid. The poly(alkylene oxide) teeth desirably have from about 6 to 67 repeat units per chain and desirably on the end not grafted to the polyacid polymer a non-reacted terminal hydroxyl or $C_1$-$C_{36}$ hydrocarbyl groups. The choice of the poly(alkylene oxide) is generally dictated by the continuous phase with poly(propylene oxide) rich teeth preferred optionally with small amounts of poly(ethylene oxide) for polar continuous media and poly(propylene oxide) or poly(butylene oxide) teeth being more appropriate for non-polar continuous media.

It has been found that the above dispersants show excellent ability to disperse inorganic pigments (preferably mixed metal oxide pigments) to produce colloidally stable non-aqueous mixed metal oxide dispersions and, non-aqueous ink jet inks for the colouration of ceramic tiles and glass using ink jet ink printers. Thus, according to the present invention, there is provided a composition comprising a particulate solid; a continuous media selected from aliphatic hydrocarbon, mid-polar ester and/or polar ether or blends thereof; and a dispersing agent having terminal end groups and a central portion of the structure

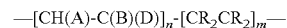  Formula (1)

wherein repeat units of —[CH(A)-C(B)(D)]- and —[CR$_2$CR$_2$]— may be in any order such as random, blocky and mixtures thereof:

n is 10-1400 (more preferably 10-140);
m is 0-140 (more preferably 0-14, most preferably 0);
n is at least 10 times greater than m;
each R is independently H or $C_1$-$C_{36}$ (desirably $C_1$-$C_{18}$, preferably $C_1$-$C_6$) hydrocarbyl group that can be a cyclic; branched or non-branched alkyl, aryl, alkylaryl, or arylalkyl, that may optionally contain O, N, F, Cl, and/or Br atoms [e.g. $CR_2CR_2$ is the residue of a $R_2C=CR_2$ containing molecule after its radical reaction into the acrylic polymer]; and preferably [$CR_2CR_2$] is a non-acidic monomer/repeat unit;
A is H or B;
B is independently E or G or —C(=O)—, wherein B can only be —C(=O)— when it is adjacent to a G group comprising an X group comprising a nitrogen atom, wherein said nitrogen atom can chemically bond to the carbon of the carbonyl group to form a 5-membered or 6-membered cyclic imide;
D is —H or —$CH_3$ or —$CH_2$B, wherein D can only be —$CH_2$B when A is —H;
E is an acid group selected from —$CO_2$H, —W—P(=O)—(OH)ε where ε is 1 or 2, and —W—S(=O)$_2$—OH where W independently in each repeat unit is a1) a direct link between a backbone carbon atom and the phosphorus or sulfur atom, b1) a hydrocarbylene linking group of 1-7 carbon atoms defined to optionally including ether, ester, or amide linking groups and/or hydroxyl pendant groups, or c1) a poly($C_{2-4}$-alkyleneoxide) of up to 7 repeat units and optionally including an ether, ester, or amide linking group; wherein a proportion of the acid groups may be in the salt form, so that up to 1% (and more desirably up to 0.3%) by weight of the dispersant is from the counter ion of the salt, these counter ions can be metal ions including sodium, lithium, and potassium, or amines including ammonium and tri-$C_1$-$C_3$-alkanolamine (preferably triethanolamine);
G is CO—X—($C_yH_{2y}$O)$_t$—R';
X is —O— or —N(H)— or —N=, note X can only be —N= when it is adjacent to a B group in the —C(=O)— form and the B group with the nitrogen form a cyclic imide;
y is independently 2, 3 or 4 in each repeat unit;
y can be 2 in 30% or less of the repeat monomer units, and more desirably 22% or less of monomer units within the overall dispersant structure;
R' is a $C_1$-$C_{36}$ (desirably $C_1$-$C_{18}$, preferably $C_1$-$C_6$) hydrocarbyl group that can be a cyclic, branched or non-branched alkyl, aryl, alkylaryl, or arylalkyl;
t is 6-67 (more preferably 6-45);
the mole % of each type of B unit, based on the total B units in the repeat units, is from 15%-60% of G units, from 10-85% of E units, and from 0%-45% of C(=O)— units; and
in order to facilitate synthesis the above dispersant the nature of G desirably meets at least one of the below categories;
1) 15 mole % or more of X must be either —N(H)— or —N= or mixtures of —N(H)— and —N=, or 2) y is 2 in at least 85 mole % of the repeat units of any —($C_yH_{2y}$O)$_t$-chain in at least 15 mole % of G groups and the other 85 mole % or less of G groups contain a R' group that is no longer than 6 carbon atoms.

DETAILED DESCRIPTION OF THE INVENTION

The invention relates to the use of a class of dispersants in ceramic ink jet inks formulations, to dispersions containing such dispersants together with a particulate solid (mixed metal oxides) and an organic medium (aliphatic hydrocarbon, fatty acid esters and glycol ether/esters), and compositions comprising a particulate solid, an organic medium and a dispersant and to their use in ceramic inkjet inks and mill-bases. Many formulations such as inks, paints and mill-bases require effective dispersants for uniformly distributing a particulate solid in an organic medium.

In one embodiment, the invention relates to a pigment dispersion composition comprising:
a) 79-20 wt. % of continuous liquid media, including aliphatic hydrocarbon, mid-polar ester medium and/or polar ether medium (more desirably one or more of aliphatic hydrocarbon, mid-polar ester medium and polar ether medium);
b) 20-60 wt. % of a mixed metal oxide ceramic pigment in particulate form that develops its full color intensity and hue after firing at elevated temperatures;
c) 1-20 wt. % of a dispersant having terminal end groups and a central portion of the structure —[CH(A)-C(B)(D)]$_n$-[$CR_2CR_2$]$_m$—
wherein repeat units of —[CH(A)-C(B)(D)]- and —[$CR_2CR_2$]— may be in any order such as random, blocky and mixtures thereof: and wherein the weight percents are based on the weight of the dispersion of mixed metal oxide with the dispersant in the media;
n is 10-1400 (more preferably 10-140);
m is 0-140 (more preferably 0-14, most preferably 0);
n is at least 10 times greater than m;
each R is independently H or $C_1$-$C_{36}$ (desirably $C_1$-$C_{18}$, preferably $C_1$-$C_6$) hydrocarbyl group that can be a cyclic; branched or non-branched alkyl, aryl, alkylaryl, or arylalkyl, that may optionally contain O, N, F, Cl, and/or Br atoms [e.g. $CR_2CR_2$ is the residue of a $R_2C=CR_2$ containing molecule after its radical reaction into the acrylic polymer];
A is H or B;
B is independently E or G or —C(=O)—, wherein B can only be —C(=O)— when it is adjacent to a G group comprising an X group comprising a nitrogen atom, wherein said nitrogen atom can chemically bond to the carbon of the carbonyl group to form a 5-membered or 6-membered cyclic imide;
D is —H or —$CH_3$ or —$CH_2$B, wherein D can only be —$CH_2$B when A is —H
E is an acid group selected from —$CO_2$H, —W—P(=O)—(OH)ε where ε is 1 or 2, and —W—S(=O)$_2$—OH where W independently in each repeat unit is a1) a direct link between a backbone carbon atom and the phosphorus or sulfur atom, b1) a hydrocarbylene linking group of 1-7 carbon atoms defined to optionally including ether, ester, or amide linking groups and/or hydroxyl pendant groups, or c1) a poly($C_{2-4}$-alkyleneoxide) of up to 7 repeat units and optionally including an ether, ester, or amide linking group; wherein a proportion of the acid groups may be in the salt form, so that up to 1% (and more desirably up to 0.3%) by weight of the dispersant is from the counter ion of the salt, these counter ions can be metals ions including lithium, sodium and potassium, or amines including ammonium and tri-$C_1$-$C_3$-alkanolamine (preferably triethanolamine);
wherein said salts are preferable free of (desirably less than 1 wt. %, more desirably less than 0.3 wt. % and preferable less than 0.1 wt. %) of aminic polybasic species such as polyamine with 2 or more amine groups that may be linear or branched having a molecular weight from about 140 to 100,000 g/mole;

G is CO—X—$(C_yH_{2y}O)_t$—R';
X is —O— or —N(H)— or —N=, note X can only be —N= when it is adjacent to a B group in the —C(=O)— form and the B group with the nitrogen form a cyclic imide;
y is independently 2, 3 or 4 in each repeat unit;
y can be 2 in 30% or less of the repeat monomer units, and more desirably 22% or less of monomer units within the overall dispersant structure;
R' is a $C_1$-$C_{36}$ hydrocarbyl group (desirably a $C_1$-$C_{18}$ hydrocarbyl group) that can be a cyclic, branched or non-branched alkyl, aryl, alkylaryl, or arylalkyl;
t is 6-67 (more preferably 6-45);
the mole %, based on the total B units in the repeat units, is from 15%-60% of G units, from 10-85% of E units, and from 0%-45% of C(=O)— units; and in order that it is possible to synthesis the above additive the nature of G must fall into at least one of the below categories
1) 15 mole % or more of X must be either —N(H)— or —N= or mixtures of —N(H)— and —N=;
or 2) y is 2 in at least 85 mole % of the repeat units of any —$(C_yH_{2y}O)_t$— chain in at least 15 mole % of G groups and the other 85 mole % or less of G groups contain a R' group that is no longer than 6 carbon atoms.

When X is NH, 0-100% of the NH can react with an adjacent —$CO_2H$ (defined by A or B) to give —N= (a five membered imide ring repeat unit as shown below):

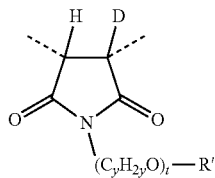

and/or with —$CH_2$—$CO_2H$ (defined by D) to give a five membered imide as shown below:
the repeat unit being of the structure

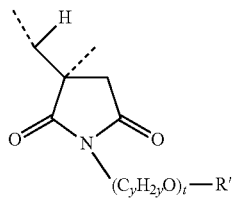

and/or two of adjacent repeat units from the polyacid might form a six membered imide ring when a nearby B is —$CO_2H$ and X is —N(H)— as shown below

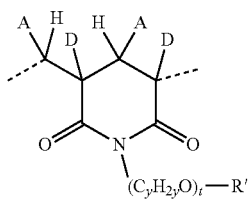

wherein A, D, t, y, and R' are defined as above and the short dashed line indicates where the rest of the polyacid molecule is attached to the repeat unit.

In one embodiment the invention relates to a process for milling an inorganic mixed metal oxide particulate, having a dry powder volume average particle diameter $D_{50}$ in excess of 2 micron, in a continuous medium to a $D_{50}$ particle size of less than 700 nanometers, said process comprising; a) blending said continuous medium, said inorganic mixed metal oxide particulate, wherein said inorganic mixed metal oxide particulate is a mixed metal oxide pigment that develops its color intensity and hue after firing at elevated temperatures, optionally including a vitreous glaze material, having a dry powder volume average particle diameter in excess of 2 micron, and a dispersing agent having terminal end groups and a central portion of the structure

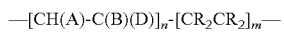

wherein repeat units of —[CH(A)-C(B)(D)]— and —[$CR_2CR_2$]— may be in any order such as random, blocky and mixtures thereof:
n is 10-1400 (more preferably 10-140);
m is 0-140 (more preferably 0-14, most preferably 0);
n is at least 10 times greater than m;
each R is independently H or $C_1$-$C_{36}$ (desirably $C_1$-$C_{18}$, preferably $C_1$-$C_6$) hydrocarbyl group that can be a cyclic; branched or non-branched alkyl, aryl, alkylaryl, or arylalkyl, that may optionally contain O, N, F, Cl, and/or Br atoms [e.g. $CR_2CR_2$ is the residue of a $R_2C=CR_2$ containing molecule after its radical reaction into the acrylic polymer];
A is H or B;
B is independently E or G or —C(=O)—, wherein B can only be —C(=O)— when it is adjacent to a G group comprising an X group comprising a nitrogen atom, wherein said nitrogen atom can chemically bond to the carbon of the carbonyl to form a cyclic imide;
D is —H or —$CH_3$ or —$CH_2B$, wherein D can only be —$CH_2B$ when A is —H;
E is an acid group selected from —$CO_2H$, —W—P(=O)—(OH)ε where ε is 1 or 2, and —W—S(=O)$_2$—OH where W independently in each repeat unit is a1) a direct link between a backbone carbon atom and the phosphorus or sulfur atom, b1) a hydrocarbylene linking group of 1-7 carbon atoms defined to optionally including ether, ester, or amide linking groups and/or hydroxyl pendant groups, or c1) a poly($C_{2-4}$-alkyleneoxide) of up to 7 repeat units and optionally including an ether, ester, or amide linking group; wherein a proportion of the acid groups may be in the salt form, so that up to 1% (and more desirably up to 0.3%) by weight of the of the dispersant is from the counter ion of the salt, these counter ions can be metals ions including sodium, lithium, and potassium, or amines including ammonium and tri-$C_1$-$C_3$-alkanolamine (preferably triethanolamine);
G is CO—X—$(C_yH_{2y}O)_t$—R';
X is —O— or —N(H)— or —N=, note X can only be —N= when it is adjacent to a B group in the —C(=O)— form and the B group with the nitrogen form a cyclic imide;
y is independently 2, 3 or 4 in each repeat unit;
y can be 2 in 30% or less of the repeat monomer units, and more desirably 22% or less of monomer units within the overall dispersant structure;
R' is a $C_1$-$C_{36}$ (desirably $C_1$-$C_5$, preferably $C_1$-$C_6$) hydrocarbyl group that can be a cyclic, branched or non-branched alkyl, aryl, alkylaryl, or arylalkyl;
t is 6-67 (more preferably 6-45);
mole %, based on the total B units in the repeat units, is from 15%-60% of G units, from 10-85% of E units, and from 0%-45% of C(=O)— units; and in order that it is possible to synthesis the above additive the nature of G must fall into at least one of the below categories 1) 15 mole % or more of X must be either —N(H)— or —N= or mixtures of —N(H)— and —N=; or
2) y is 2 in at least 85 mole % if the repeat units of any —($C_yH_{2y}O$)$_t$— chain in at least 15 mole % of G groups and the other 85 mole % or less of G groups contain a R' group that is no longer than 6 carbon atoms;

b) milling said mixed metal oxide pigment dispersed with said dispersing agent in said continuous medium using a bead mill for 5 minutes to 60 hours; and c) confirming the volume average particle diameter $D_{50}$ is less than 700 nanometers.

In one embodiment the invention relates to a process for digitally printing on ceramic article or glass article substrate using an ink jetted through a nozzle;

a) providing a mixed metal oxide dispersed in a continuous medium with a dispersing agent having terminal end groups and a central portion of the structure —[CH(A)-C(B)(D)]$_n$-[CR$_2$CR$_2$]$_m$—;

b) jetting said mixed metal oxide dispersed in said continuous medium using said dispersing agent onto said substrate to form a pigmented digital image (optionally on a pre-glaze layer(s) on a ceramic surface), wherein said pigmented digital image on said substrate develops into a colored image upon firing said ceramic substrate or heating said glass substrate to provide tempering or annealing; and c) optionally applying a glaze over said digital image; and d) heating said ceramic article at an elevated temperature or heating said glass article to anneal or temper it, wherein said image from mixed metal oxide develops optimal color intensity upon heating to its color;

wherein repeat units of —[CH(A)-C(B)(D)]— and —[CR$_2$CR$_2$]— may be in any order such as random, blocky and mixtures thereof:

n is 10-1400 (more preferably 10-140);
m is 0-140 (more preferably 0-14, most preferably 0);
n is at least 10 times greater than m;
each R is independently H or $C_1$-$C_{36}$ (desirably $C_1$-$C_{18}$, preferably $C_1$-$C_6$) hydrocarbyl group that can be a cyclic; branched or non-branched alkyl, aryl, alkylaryl, or arylalkyl, that may optionally contain O, N, F, Cl, and/or Br atoms [e.g. CR$_2$CR$_2$ is the residue of a R$_2$C=CR$_2$ containing molecule after its radical reaction into the acrylic polymer];
A is H or B;
B is independently E or G or —C(=O)—, wherein B can only be —C(=O)— when it is adjacent to a G group comprising an X group comprising a nitrogen atom, wherein said nitrogen atom can chemically bond to the carbon of the carbonyl to form a cyclic imide;
D is —H or —CH$_3$ or —CH$_2$B, wherein D can only be —CH$_2$B when A is —H;
E is an acid group selected from —CO$_2$H, —W—P(=O)—(OH)ε where ε is 1 or 2, and —W—S(=O)$_2$—OH where W independently in each repeat unit is al) a direct link between a backbone carbon atom and the phosphorus or sulfur atom, b1) a hydrocarbylene linking group of 1-7 carbon atoms defined to optionally including ether, ester, or amide linking groups and/or hydroxyl pendant groups, or c1) a poly($C_{2-4}$-alkylene-oxide) of up to 7 repeat units and optionally including an ether, ester, or amide linking group; wherein a proportion of the acid groups may be in the salt form, so that up to 1% (and more desirably up to 0.3%) by weight of the of the dispersant is from the counter ion of the salt, these counter ions can be metals ions including sodium, lithium, and potassium, or amines including ammonium and tri-$C_1$-$C_3$-alkanolamine (preferably triethanolamine);

G is CO—X—($C_yH_{2y}O$)$_t$—R';
X is —O— or —N(H)— or —N=, note X can only be —N= when it is adjacent to a B group in the —C(=O)— form and the B group with the nitrogen form a cyclic imide;
y is independently 2, 3 or 4 in each repeat unit;
y can be 2 in 30% or less of the repeat monomer units, and more desirably 22% or less of monomer units within the overall dispersant structure;
R' is a $C_1$-$C_{36}$ (desirably $C_1$-$C_{18}$, preferably $C_1$-$C_6$) hydrocarbyl group that can be a cyclic, branched or non-branched alkyl, aryl, alkylaryl, or arylalkyl;
t is 6-67 (more preferably 6-45);
mole % of each type of B unit, based on the total B units in the repeat units, is from 15%-60% of G units, from 10-85% of E units, and from 0%-45% of C(=O)— units; and
in order that it is possible to synthesis the above additive the nature of G must fall into at least one of the below categories 1) 15 mole % or more of X must be either —N(H)— or —N= or mixtures of —N(H)— and —N=; or
2) y is 2 in at least 85 mole % of the repeat units of any —($C_yH_{2y}O$)$_t$— chain in at least 15 mole % of G groups and the other 85 mole % or less of G groups contain a R' group that is no longer than 6 carbon atoms.

It is understood that the dispersing agent is as generally described above for a wide variety of continuous media including those varying from polar to relatively nonpolar hydrocarbons. Generally, the polymeric backbone of the dispersing agent will function to anchor the dispersing agent to the mixed metal oxide particulate. The polyether segments of G of the dispersing agent function as solubilizing chains extending into the continuous medium and providing a steric barrier layer when the dispersant functions to disperse particulate. The more compatible the polyether chains are with the continuous phase the better they will function as steric stabilizing chains. The polarity of the G group must be similar to the polarity of the continuous phase (e.g. solvent) used in the formulation. If the continuous phase (e.g. solvent) is an aliphatic hydrocarbon in the formulation, G desirably comprises a non-polar poly(alkylene oxide) and desirably would mainly comprise y of 3 or 4 such as propylene oxide or butylene oxide. If the continuous phase (e.g. solvent) is a glycol ether or ester in the formulation, G is desirably more polar and desirably would mainly comprise of y being 3 or 4 such as propylene oxide or butylene oxide and y being 2 (such as ethylene oxide) in up to 30 mol % of the repeat units. In one embodiment one poly(alkylene oxide) in one G repeat unit could be polyethylene oxide rich (e.g. y=2) while another poly(alkylene oxide) in another G repeat unit could be poly(propylene oxide) or poly(butylene oxide) rich provided the average moles of y=2 and y=3 or 4 meet the limitations in the previous sentence.

Definitions

To simplify things we will use parentheses around "meth" to indicate that a named molecule can optionally include a methyl substituent such as (meth)acrylic acid will refer to methacrylic acid and/or acrylic acid and methyl (meth) acrylate will refer to methacrylate and/or acrylate. We will use the symbolic representation C(=O)—OH to represent carboxylic acid in any form such as the acid form, the salt form, or if two carboxylic acids are physically adjacent and can form an anhydride ring, the anhydride form. The term —N= will refer to a nitrogen bonded to three other non-hydrogen atoms, and preferably a nitrogen bonded to a polyether at one bond site and to two different carbonyls (forming an imide) at the other two bond sites.

The term hydrocarbyl will refer to monovalent hydrocarbon groups that may optionally include other heteroatoms (such as O, N, F, Cl, and Br) in conventional or specified amounts. The term hydrocarbylene will refer to divalent hydrocarbon groups that may optionally include other heteroatoms in conventional or specified amounts. We will use the term hydrocarbyl to describe a hydrocarbon type group with one hydrogen removed. Hydrocarbyl in this specification will mean hydrocarbon like and can desirably include up to one oxygen and/or nitrogen for every four carbon atoms in the group, but preferably is just carbon and hydrogen atoms. For the avoidance of doubt, when we are counting carboxylic acid or carbonyl groups, we will count an anhydride of a dicarboxylic acid and an imide as having two carbonyl groups.

In the polyether formulas we intend the larger alkylene oxide unit to comprise, propylene oxide, butylene oxide or combinations of propylene oxide and butylene oxide including linear and branched forms. We will also use $C_yH_{2y}O$ where y is predominantly 3 and/or 4 to express this concept. We intend that the polyethers can be random or blocky and do not intend for them to limit the polyethers to a single block or blocks of any particular repeat unit. The polyether chain composition of the poly(alkyleneoxide) monoalkyl ether monoamine or poly(alkyleneoxide) monoalkyl ether may vary depending on whether the polymer of the present invention is being used in polar or non-polar medium. When the polymer of the present invention is used in polar medium, the polyether may contain 0 to 30 mole %, or 0 to 25 mole %, or 0 to 15 mole % of ethylene oxide and may contain 70 to 100 mole %, or 75 to 100 mole %, or 85 to 100 mole % of propylene oxide and/or butylene oxide. When the polymer of the present invention is used in non-polar medium, the polyether may contain propylene oxide and/or butylene oxide. In one embodiment, the poly(alkyleneoxide) monoalkyl ether monoamine or poly(alkyleneoxide) monoalkyl ether may contain a polyether chain of either (i) a polypropylene oxide homopolymer or (ii) a polybutylene oxide homopolymer or (iii) a copolymer of ethylene oxide and propylene oxide.

Desirably the dispersions of mixed metal oxides, dispersing agent, and continuous media is adjusted to desirable viscosities for ink jet printing. Desirable viscosities include from about 1, 2, or 3 to about 15, 20, 30 or 50 cps at @ 30 $s^{-1}$ at 25° C.

In one embodiment, the molecular weight of the dispersant of Formula 1 is between 2000 and 200,000 or 300,000 g/mole, and preferably is from 2000 to 75,000 or 100,000 g/mole. In one embodiment the dispersant is comprised of 90, 95 or 98 wt. % or more of the specified repeat units in the formula and 2, 5, or 10 wt. % or less of non-specified terminal groups. The terminal groups are well known fragments of free radical initiator species and chain transfer fragments that are incorporated into the polymer during conventional polymerization processes of the polyacid. The polyacid backbone of the dispersant may have a few (but not many) branch points from unknown origin or from use of a difunctional, trifunctional, or tetrafunctional monomers during polymerization. The wt. ratios of terminal groups can vary with molecular weight of the polyacid component, with low molecular weight dispersants have higher weight percentages of said terminal groups.

In one embodiment, an ink comprises a dispersion of a mixed metal oxide in a non-aqueous media. In another embodiment, the ink is in the form of an ink jet ink.

In another embodiment, the ink is in an ink jet printer cartridge comprising a chamber which contains the ink including the continuous media, the dispersant, the mixed metal oxide pigments and any optional components to the dispersion or the ink.

In one embodiment, the polyacid will be primarily poly(meth)acrylic acid (e.g. >50% of the repeating units will be conventional repeat unit from polymerizing (meth)acrylic acid). In one embodiment, the polyacid will include from 5 to 50 number percent of repeating units from maleic acid or maleic anhydride.

Various preferred features and embodiments will be described below by way of non-limiting illustration.

When X is —NH— or —N=, the G group may be derived from a poly(alkyleneoxide) monoalkyl ether monoamine. The monoamine compounds of this type are commercially available as the Surfonamine® or Jeffamine™ amines from Huntsman Corporation. Specific examples of Surfonamine® amines are B-60 (propylene oxide to ethylene oxide mole ratio of 9:1), B-200 (propylene oxide to ethylene oxide mole ratio of 29:6) and B-100 (contains propylene oxide only). The poly(alkyleneoxide) monoalkyl ether monoamine may be prepared by reacting a $C_{1-36}$ mono-hydrocarbyl alcohol initiator with propylene oxide or butylene oxide only or as mixtures with ethylene oxide thereof to form an alcohol-ended polymer chain, followed by conversion of the alcohol-ended polymer chain to an amine as disclosed in a number of examples.

When X is oxygen, the G group may be derived from a poly(alkyleneoxide) monoalkyl ether. These mono-alkyl ethers are available from a variety of sources such as Sigma-Aldrich, Croda, BASF and Ineos.

The polyacid may be prepared by processes known to a skilled person and functionalized with the polyether species by any method known to the art. For example, the polyacid may be prepared by esterification or amidation of poly(meth)acrylic acid or poly(meth)acrylic acid/maleic acid copolymer, or polymerization of (meth)acrylic acid with (meth)acrylic esters and/or amides or polymerization of (meth)acrylic acid with maleic acid (or maleic anhydride), (meth)acrylic esters and/or amides and maleic acid esters and/or amides by any known polymerization technique or a combination of polymerization techniques using a bulk, solution, suspension or emulsion process. The polymerization may comprise of a radical, anionic, cationic, atom transfer or group transfer polymerization process or combinations thereof.

In one embodiment, the above processes can be carried out, by those skilled in the art, using a variety of copolymers such as poly(meth)acrylic-co-maleic acid; polyacrylic-co-itaconic acid; polyacrylic-co-AMPS acid, polyitaconic-co-acrylate acid; polyitaconic-co-acrylamide acid; etc. in place of poly(meth)acrylic acid. A variety of unsaturated co-monomers can be incorporated into the polyacid.

Examples of anionic monoethylenically unsaturated monomers containing sulphonic acid groups, which may be in the free acid form or salt, include allylsulfonic acid, methallylsulfonic acid, styrenesulfonic acid, vinylsulfonic acid, vinyl benzylsulphonic acid, allyloxybenzenesulfonic acid, 2-acrylamido-2-methylethanesulfonic acid, 2-acrylamido-2-methylpropanesulfonic acid, 2-acrylamido-2-methylbutanesulfonic acid, 2-methacrylamido-2-methylethanesulfonic acid, 2-methacrylamido-2-methylpropanesulfonic acid, 2-methacrylamido-2-methylbutanesulfonic acid, acryloyloxymethylsulfonic acid, 2-(acryloyl)oxyethylsulfonic acid, 3-(acryloyl)oxypropylsulfonic acid, 4-(acryloyl)oxybutylsulfonic acid, methacryloyloxymethylsulfonic acid, 2-(methacryloyl)oxyethylsulfonic acid, 3-(methacryloyl)oxypropylsulfonic acid, 4-(methacryloyl)oxybutylsulfonic acid, and their salts thereof.

Examples of anionic monoethylenically unsaturated monomers containing phosphoric or phosphonic acid groups, which may be in the free acid form or salt, include monovinyl phosphate, monoallyl phosphate, 3-butenylphosphonic acid, mono-3-butenyl phosphate, mono(4-vinyloxybutyl) phosphate, the phosphate esters of [hydroxyalkyl (meth)acrylates, hydroxyalkyl(meth)acrylamides or their polyalkoxylate derivatives of molecular weight Mn 150-700 such as 2-hydroxyethyl(meth)acrylate, hydroxypropyl (meth)acrylate and 4-hydroxybutyl(meth)acrylate, N-hydroxyethylacrylamide, N-hydroxyethylmethacrylamide hydroxypoly(ethyleneoxide)(meth)acrylate, and polypropyleneglycol (meth)acrylate], mono(2-hydroxy-3-vinyl oxypropyl) phosphate, mono(1-phosphonoxymethyl-2-vinyloxyethyl) phosphate, mono(3-allyloxy-2-hydroxypropyl) phosphate, mono(2-allyloxy-1-phosphonoxymethylethyl) phosphate, their salts and/or esters, especially C1 to C8 monoalkyl, dialkyl and, if appropriate, trialkyl esters, of the monomers containing phosphoric acid and/or phosphonic acid groups. Other suitable phosphonic acid monomers are disclosed in WO 99/25780 A1, and include vinyl phosphonic acid, allyl phosphonic acid, 2-acrylamido-2-methylpropanephosphonic acid, α-phosphonostyrene, 2-methylacrylamido-2-methylpropanephosphonic acid. Further suitable phosphorus functional monomers are 1,2-ethylenically unsaturated (hydroxy)phosphinylalkyl (meth)acrylate monomers, disclosed in U.S. Pat. No. 4,733,005, and include (hydroxy)phosphinylmethyl methacrylate. One preferred monomer is vinylphosphonic acid, or hydrolyzable esters thereof.

In one embodiment, up to 10 or 5 mole % (more desirably up to 2 or up to 1 mole % and preferably 0 mole %) of the repeating units of the polyacid component can be derived from a free radically polymerizable monomer containing a carbon-to-carbon double bond (e.g. $C(R_2)=CR_2$) and being without a carboxylic group or acids from sulfur or phosphorus, such repeat units will be from styrene, ethylene, propene, butenes, (meth)acrylate esters of (meth)acrylic acid and $C_1$-$C_{18}$ alcohols, and (meth)acrylate hydroxyl ester such as hydroxyl ethyl (meth)acrylate, hydroxyl butyl (meth) acrylate, vinyl acetate, (meth)acrylamides, vinyl substituted heterocyclics such as vinyl pyrrolidinone, vinyl imidazole, vinyl carbazole, 2-vinylpyridine, and 4-vinylpyridine. We are describing the polyacid component before functionalization with the polyether species, when we say that up to 10, 5, 2, or 1 mole % of the repeat units can be of the different monomer.

In one embodiment, the invention provides for a compound obtained or obtainable by reacting a polyacid (typically with a number average molecular weight between 700 to 50,000, or 700 to 28,000), either as an aqueous solution or a solid with G-H as defined herein, in a weight ratio of polyether (G-H) to polyacid from 4:1 to 25:1 and more desirably from 5:1 to 20:1, optionally in the presence of a catalyst, typically an acid or base catalyst, at a temperature between 120 and 200° C., under an inert atmosphere, for a duration of between 2 and 72 hours, ensuring that water present in the reaction or generated during the reaction is removed.

In another embodiment, the ink is of the type to be printed from an ink jet printer of the kind including piezo, thermal, acoustic and electrostatic mechanism to propel the ink from the printhead. Preferably, the printers utilized with these inks are of the piezo or electroacoustic drop on demand (DOD) type.

In another embodiment, the ink is printed on a substrate comprising either a ceramic object, e.g., tile or article including plates, bowls, saucers, cups, decorative ceramics, roofing tiles, or a glass substrate, e.g., pane or article such as a drinking glass, container, cup, etc.

Another embodiment is the ink jet ink is printed on a substrate, e.g., ceramic tiles, by single pass inline and glass articles by multi pass off line DOD printers.

The particulate solids are mixed metal oxides used in the colouration of ceramic tiles. A particular highlight includes the dispersion of metal contaminants present within the coloured mixed metal oxide inorganic pigments to produce a more homogeneous colour shade pattern free from streaks and striations caused by metal impurities and providing a much brighter shade.

The invention relates to the use of a class of dispersants in ceramic ink jet inks formulations, to dispersions containing such dispersants together with a particulate solid (mixed metal oxides) and a continuous medium (which can comprise aliphatic hydrocarbon, mid-polar fatty acid esters, or polar glycol ethers/esters, and various blends thereof), and compositions comprising a particulate solid, a continuous medium and a dispersant and to their use in ceramic ink jet inks and mill-bases. Many formulations such as inks, paints and mill-bases require effective dispersants for uniformly stabilising a particulate solid in a continuous medium.

Coloration of ceramic tiles by ink jet inks is a rapidly growing technology and providing stable inkjet ink dispersions of mixed metal oxides with $D_{50}$ particle sizes below 700 nm in various continuous medium within a short milling time has been problematic.

Using the dispersant of the current application has provided stable ink jet ink dispersions containing mixed metal oxides with low particle sizes in a much reduced milling time, better filterability of the dispersions leading to increased millbase yield and reduction of waste, much brighter shades and better dispersion of metal impurities found in the mixed metal oxides.

According to the present invention there is provided a composition comprising a particulate solid, a continuous medium (non-aqueous), and a dispersing agent having terminal end groups and a central portion of the structure —[CH(A)-C(B)(D)]$_n$-[CR$_2$CR$_2$]$_m$—; used as or in part as an ink jet ink for the coloration of ceramic tiles using an ink jet ink printer.

The particulate solids can be mixed metal oxides or mixtures thereof, which may contain undesired metal impurities from abrasive wear of the milling equipment or beads, present as contaminants and/or as impurities from the milling process.

The continuous media can be aliphatic hydrocarbon, mid-polar ester, poly glycol ethers/esters, or compatible blends thereof.

The polar solvents can be a variety of low molecular weight monohydric or polyhydric alcohols, glycols, glycol ethers, polyglycols, low molecular weight mono and polyacids condensed with low molecular weight mono and polyhydroxyl compounds, including fatty acid esters, etc.

The fatty acid esters of $C_{15-20}$ fatty acids tend to be less polar fatty acid esters than esters from lower molecular weight saturated mono and polyacids.

In one embodiment, non-polar organic liquids are compounds containing aliphatic groups or mixtures thereof, preferably hydrocarbons of 6 to 40 carbon atoms, esters of various carboxylic acids of 4 to 30 carbon atoms with alcohols of 4 to 30 carbon atoms, and $C_2$ to $C_4$ alkylene oxides of 1 to 5 repeat units with hydroxyl, $C_1$-$C_5$ ether, or $C_2$-$C_5$ ester end groups. The non-polar organic liquids include non-halogenated aliphatic hydrocarbons (e.g., linear and branched aliphatic hydrocarbons containing six or more carbon atoms both fully and partially saturated), and natural non-polar organics (e.g., vegetable oil, sunflower oil, linseed oil, terpenes and glycerides).

In one embodiment, the preferred solvents used in the dispersion of the ceramic mixed metal oxides with the dispersants of Formula (1) include petroleum distillate (various boiling fractions including $C_{16-20}$ alkanes mixtures and cyclic alkanes), paraffin, mineral spirit, octyl octanoate, 2-ethylhexyl-stearate, 2-ethylhexyl-cocoate, di-octyl adipate, isopropyl laurate, ethylhexyl cocoate, propylene glycol dicaprylate, triethylene glycol mono-2-ethylhexanoate, triethylene glycol bis-2-ethylhexanoate, tripropylene glycol methyl ether, dipropylene glycol (methyl ether), di-propylene glycol (n-butyl ether), isopropyl bisphenols such as 2,2-bis(4-hydroxy-3-isopropyl-phenyl)propane, isopropyl myristate, isopropyl palmitate, isopropyl stearate, isocetyl laurate, isocetyl stearate, ethylhexyl palmitate, or mixtures thereof.

In one embodiment, the organic liquid media is free of water. As used herein, the expression substantially free of water indicates that the reaction contains a minimal amount of water, for instance contaminant or trace amounts not removed in normal processing. In one embodiment, the organic liquid of the continuous medium optionally contains less than 7, more desirably less than 5, and preferably less than 1 wt. % of water based on the weight of the dispersion. In one embodiment, the continuous media is free of water.

The organic liquid of the invention may be a polar medium or non-polar medium. By the term "polar" in relation to the organic liquid, it is meant that an organic liquid is capable of forming moderate to strong bonds as described in the article entitled "A Three Dimensional Approach to Solubility" by Crowley et al. in Journal of Paint Technology, Vol. 38, 1966, at page 269. Polar organic liquids generally have a dielectric constant of 5 or more as defined in the abovementioned article. Non-polar liquids typically have a dielectric constant of less than 5.

Numerous specific examples of such moderately strong hydrogen bonding liquids are given in the book entitled "Compatibility and Solubility" by Ibert Mellan (published in 1968 by Noyes Development Corporation) in Table 2.14 on pages 39-40 and these liquids all fall within the scope of the term polar organic liquid as used herein.

Advantages of the current dispersing agent would be reduced milling time, better dispersion of any metal impurities and/or contaminants leading to homogeneous coloured shades, brighter shades, better particle size stability during storage, improved filterability and increased dispersion/ink yield, reduced syneresis, reduced sedimentation and less phase separation.

A preferred particulate solid is mixed metal oxides used in the colouration of ceramic tiles and glass. For the purposes of this invention, mixed metal oxides is interpreted as the solid containing at least two different metals in the same or different oxidation states. A particular improvement from using the dispersants of this disclosure includes the reduction of metal contaminants derived from abrasive wear of the milling equipment as the particular mixed metal oxides are hard to mill and require hard ceramic beads to mill these pigments. The dispersants of this disclosure tend to shorten the milling time required to meet a desirable particle size. When the total milling time on bead mills using hard ceramic beads is reduced, the amount of abrasive wear on both the beads and the internal components of the mill is generally reduced. Reducing the abrasive wear means less metal contaminants from the internal parts of the mill and the beads are introduced into the milled product. While metal contaminants are usually low in color in most pigment binder based coatings, metal contaminants can drastically affect color shade and color intensity in mixed metal oxides fired above 600° C. for colouring ceramic articles and glass.

This disclosure also provides for a method of milling a metal oxide pigment having an initial volume average particle diameter in excess of 2 micron in a non-polar aliphatic hydrocarbon, mid-polar ester medium and/or polar ether medium to an average particle size of less than 700 nanometers, said process comprising;

(a) blending a aliphatic hydrocarbon, mid-polar ester medium and/or polar ether medium, a mixed metal oxide pigment, optionally including a vitreous glaze material, having a 50% volume average particle diameter in excess of 2 micron, and a dispersing agent having terminal end groups and a central portion of the structure

(b) milling said mixed metal oxide pigment dispersed with said dispersing agent in said aliphatic hydrocarbon, mid-polar ester medium and/or polar ether medium such as using a bead mill at a milling rate of 0.4 to 8 KWatt/hour per Kg of particulate or 5 mins to 60 hours milling time; and (c) confirming that the average particle diameter of 50% volume of the particles is less than 700 nanometers. In one embodiment, the particulate material can have a dry powder volume average particle diameter $D_{50}$ in excess of 2 micrometer at the start of the milling process.

This disclosure also provides a process for digitally printing on ceramic articles or glass articles using an ink jetted through a nozzle; by a) providing a mixed metal oxide pigment dispersed in a continuous medium with a dispersing agent having terminal end groups and a central portion of the structure —[CH(A)-C(B)(D)]$_n$-[CR$_2$CR$_2$]$_m$—, and wherein the particulate solid is a mixed metal oxide pigment that develops its color intensity and hue after firing at elevated temperatures;

b) jetting said mixed metal oxide dispersed in said continuous medium using said dispersing agent according to a digital image to form an image on a substrate (optionally on a pre-glaze layers on a ceramic surface) that develops color intensity on said ceramic or glass article during firing;

c) optionally applying a glaze over said digital image; and d) firing said ceramic article at a temperature above 600° C. or tempering or annealing said glass article at a temperature above 400° C. to cause said mixed metal oxide to develop its color. The pre-glaze layer can be applied using traditional methods such as a curtain coater or spray coater. Alternatively the pre-glaze layer could be applied using ink jet printer technology. Said pre-glaze layer above can be a single pre-glaze layer or multi pre-glaze layers. A pre-glaze layer is usually applied to help smooth the surface of a ceramic substrate and optionally adds components to the surface of the ceramic or glaze to optimize properties of the finished ceramic article. The pre-glaze layer(s) can include colorants.

It has been found that certain dispersants show excellent ability to disperse inorganic pigments (particularly those mixed metal oxides) to produce colloidally stable non-aqueous dispersions, non-aqueous ink jet ink dispersions and final non-aqueous ink jet inks for the colouration of ceramic tiles or glass using ink jet ink printers. Thus, according to the present invention, there is provided an inkjet ink composition comprising a mixed metal oxide particulate solid, a continuous medium and a dispersing agent having terminal end groups and a central portion of the structure —[CH(A)-C(B)(D)]$_n$-[CR$_2$CR$_2$]$_m$—.

INDUSTRIAL APPLICATION

Coloration of ceramic tiles by ink jet ink technology is a rapidly growing application due to the variety and quality of images available for digital printing via ink jet inks. The particle size of the mixed metal oxides used in older printing processes for ceramic articles and tiles were often too large to easily pass through the nozzles of most ink jet printers. Providing colloidally stable ink jet ink dispersions of mixed metal oxides with D$_{50}$ particle sizes below 700 nm in various continuous medium within a short milling time has been problematic.

In one embodiment, the compound of Formula 1 is a dispersant for mixed metal oxide pigments of the type used to colour ceramic articles such as ceramic tiles or glass where the pigments are going to be exposed to firing at 600° C. and above to cause the pigments to go from a low intensity colour to an intense permanent color.

The particulate solid present in the composition may be any inorganic solid material (such as a pigment or glaze forming compound which is substantially insoluble in the organic medium) and which after firing at elevated temperatures provides a desirable color. In one embodiment, the particulate solid is a pigment. In another embodiment, the particulate solid is or includes an aluminium or silica rich compound that helps form the glaze compound.

In one embodiment, the ink composition of the invention provides improved jetting efficiency, reduce nozzle plugging, reduced settling, easier filterability, less frequent filter plugging, and more consistent jetting in applications where a mixed metal oxide pigment is jetted onto a ceramic article, such as a ceramic tile, roofing tile, plate, saucer, bowl, etc.; or on glass article such as a pane, drinking glass, or in accordance with a digital image. In this application the use of the dispersants of this disclosure result in low concentrations of metal and metal oxide wear contaminants from the milling equipment and beads/balls. In one embodiment, the composition provided lower pigment particle size, better colloidal stability, lower amounts of entrained metal from the internal mill surfaces and beads.

Preferred pigments for colouration of ceramic objects or glass are Pigment Yellow 159 (Zr—Si—Pr, zircon praseodymium yellow or praseodymium yellow zircon) such as BASF Sicocer® F Yellow 2200; Pigment Red 232 (Zr—Si—Fe zircon) such as BASF Sicocer® F Coral 2300; Pigment Red 233 (Ca—Sn—Si—Cr, chrome tin pink sphene); Pigment Brown 33 (Zn—Fe—Cr, Spinel) such as BASF Sicocer® Brown 2700; Pigment Blue 72 (Co—Al—Cr, Cobalt Spinel blue); Pigment Blue 28 (Co—Al spinel) such as BASF Sicocer® Blue 2501; Pigment Blue 36 (Co—Al spinel) such as BASF Sicocer® Cyan 2500; Pigment Black 27 (Co—Mn—Fe—Cr spinel) such as BASF Sicocer® Black 2900; and Pigment White 12 (Zr—Si) such as BASF Sicocer® White EDT/AK-4409/2.

If desired, the compositions may contain other optional ingredients, for example, resins (where these do not already constitute the organic medium), binders, fluidizing agents, anti-sedimentation agents, plasticizers, surfactants, anti-foamers, rheology modifiers, levelling agents, gloss modifiers and preservatives.

The compositions typically contain from 20 to 40 or 60% by weight of the particulate solid, the precise quantity depending on the nature of the solid and the relative densities of the solid and the continuous medium. For example, a composition in which the solid is an inorganic material, such as an inorganic pigment, filler or extender, in one embodiment contains from 20 to 60% by weight of the solid based on the total weight of composition.

The composition may be prepared by any of the conventional methods known for preparing dispersions for colouration of ceramic articles fired above 600° C. or for glasses annealed or tempered above 400° C. Thus, the solid, the continuous medium and the dispersant may be mixed in any order, the mixture then being subjected to a mechanical treatment to reduce the particles of the solid to an appropriate size, for example, by ball milling, bead milling, gravel milling or plastic milling until the dispersion is formed. It is anticipated that a variety of particle size and dispersing equipment can be used sequentially to minimize total milling time and expense, such that a large particle size pigment can be dispersed in a continuous media with the dispersant, an initial pre-mix or pre-mill grinding to a desired particle size range, and then transfer to a bead type mill to further break down particulate particles into the D$_{50}$ 200-700 nanometer diameter (by volume average particle size measurements).

A process for milling a mixed metal oxide pigment having a volume average particle diameter in excess of 2 micron in a continuous media to a particle size of less 700 nanometers, said process comprising;

a) blending a continuous medium, a mixed metal oxide pigment having a volume average particle diameter in excess of 2 micron, an a dispersing agent having terminal end groups and a central portion of the structure —[CH(A)-C(B)(D)]$_n$-[CR$_2$CR$_2$]$_m$— b) milling said mixed metal oxide pigment dispersed with said dispersing agent in said continuous media such as using a bead mill at a milling rate of 0.4 to 8 KWatt/hour per Kg of particulate or for 5 minutes to 60 hours milling time, and c) confirming the volume average particle diameter D$_{50}$ is less than 700 nanometers.

In one embodiment, the beads used to mill the mixed metal oxide pigments are a ceramic bead rather than a metal bead. In further embodiments using ceramic beads, it is desirable that the ceramic beads are zirconium dioxide, yttrium stabilized zirconia, and/or silicon carbide. The beads are often 0.3 to 0.4 mm in diameter. The mills are often horizontal bead mills and a popular supplier of the mills is Netzsch. The milling often targets a medium value of the particle size distribution where a volume average particle diameter of D$_{50}$ of 300 nm or less and a D$_{90}$ of 500 nm or less is achieved. A D$_{50}$ of 300 nm is a value in which 50% of the particles present in a particle size distribution have diameters greater than 300 nm and 50% have diameters below 300 nm. Milling times are from about 5 minutes to 60 hours, and more desirably from about 5 minutes to 48 hours. In one embodiment, the energy used by the mill over the time period disclosed above ranges from 0.4 to 8 KWatt/ hour per Kg of particulate produced to give $D_{50}$ particles in the range disclosed above. The mills may use some classification methods to separate smaller particles from larger particles and then mill the different sized particles to different extents. Solvent may be added during milling to control viscosity, solids contents, etc. Dispersant may be added sequentially or continuously during milling as milling increases the surface area of a gram of pigment and it reduces its $D_{50}$ average particle size from in excess of 2 micron to less than 700, 600, 500, or 300 nanometer.

While not wishing to be bound by theory, it is hypothesized that some dispersants are more effective at getting to newly created surfaces during milling and stabilizing the new surfaces of fractured particles against aggregation into larger particles. Some dispersants are better anchored to particulates and better colloidally stabilize the particles during high energy mixing against agglomeration into larger sized aggregates.

The composition of the present invention is particularly suited to liquid dispersions. In one embodiment, such dispersion compositions comprise:
(a) 20 to 60 parts of a mixed metal oxide particulate solid;
(b) 1 to 20 parts of a dispersant having terminal end groups and a central portion of the structure —[CH(A)-C(B)(D)]$_n$-[CR$_2$CR$_2$]$_m$—; and
(c) 20 to 79 parts of an continuous media; wherein all parts are by weight and the amounts (a)+(b)+(c)+ optional components to the ink=100.

In one embodiment, the dispersants having terminal end groups and a central portion of the structure —[CH(A)-C(B)(D)]$_n$-[CR$_2$CR$_2$]$_m$— can be used to make self dispersable or re-dispersable pigment concentrates for colouring ceramic articles. In this embodiment, a continuous media that can be evaporated off or removed by centrifugation can be used to conduct the milling and then the pigment with dispersant thereon can be concentrated, stored, shipped etc., until needed in dispersion form. If a composition is required comprising a particulate solid and a dispersant having terminal end groups and a central portion of the structure —[CH(A)-C(B)(D)]$_n$-[CR$_2$CR$_2$]$_m$— in dry form, the organic liquid is typically volatile so that it may be readily removed from the particulate solid by a simple separation means such as evaporation. In one embodiment, the composition comprises an organic liquid continuous media having the prescribed low levels of water or free of water.

The compositions of the invention are suitable for preparing mill-bases wherein the particulate solid is milled in an organic liquid in the presence of a compound having terminal end groups and a central portion of the structure —[CH(A)-C(B)(D)]$_n$-[CR$_2$CR$_2$]$_m$—. These mill-bases can be mixed in precise ratios to form colourants for ceramic articles having specific colour intensity and shade. It is anticipated that colourants for application by ink jet technology will comprise at least 3 and up to 12 different colours that can be ink jetted to form a variety of colours, shades, intensities, etc., on ceramic articles after firing at 600° C. or more.

Typically, the mill-base contains from 20 to 60% by weight particulate solid based on the total weight of the mill-base. In one embodiment, the particulate solid is not less than 20 or not less than 25% by weight of the mill-base. Such mill-bases may optionally contain a binder added either before or after milling.

The amount of dispersant in the mill-base is dependent on the amount of particulate solid but is typically from 1 to 20% by weight of the mill-base.

Dispersions and mill-bases made from the composition of the invention are particularly suitable as pigment dispersions for use in solvent-based inks for ceramic articles especially ink jet printed ceramic objects that are fired at 600° C. or above to develop the pigment color characteristic such as wall and floor tiles.

This disclosure also includes a process for digitally printing on ceramic article or glass article using an ink jetted through a nozzle;
a) providing a mixed metal oxide pigment dispersed in an continuous medium with a dispersing agent having terminal end groups and a central portion of the structure

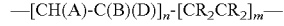

b) jetting said mixed metal oxide dispersed in said continuous medium and said dispersing agent according to a digital image to form an image that develops on said ceramic article or glass article during firing (wherein said ceramic article optionally has one or more pre-glaze layer(s) thereon prior to receiving said digital image);
c) optionally, applying a glaze over said digital image; and
d) firing said ceramic article or glass article at an elevated temperature to cause said mixed metal oxide to develop its color.

The coatings or inks made from mixed metal oxide dispersions and dispersants of this specification differ from conventional organic binder based coatings and inks in two additional details. In a preferred embodiment, the binder (if any) in the coatings and inks of this specification are substantially (e.g. ≥90 wt. %, ≥95 wt. %, or ≥99 wt. % based on the dried and heat treated coating or ink) inorganic material rather than organic material. A second significant difference is that the dispersants of this specification are significantly volatilized or burned away (e.g. ≥80 wt. %, ≥90 wt. %, or ≥99 wt. % of the dispersant is volatilized or burned away based on the weight of the dispersant prior to heat treatment). Thus, in organic binder systems the organic dispersant is retained in the final ink or coating as an interface between the binder and the particulate matter. In the inks and coatings of this specification, the dispersant is only present until the heat treatment of the article and the coating or ink to melt and fuse the ink to the ceramic or glass substrate. After the heat treatment the dispersant is substantially burned away or volatilized so that the coating or ink and the particulate (e.g., pigment (mixed metal oxide) or vitreous material of the glaze) is substantially free of any organic dispersant at the interface between the particulate and the inorganic materials of the ceramic or glass.

Ceramic articles will generally mean a variety of useful and decorative items formed from clay and porcelain that develop additional strength from an elevated temperature treatment (such as about 400 to about 1200° C.) that fuses the inorganic material providing additional mechanical strength and resistance to liquids. They include, but are not limited to, tiles in various sizes and shapes, cups, jars, crocks, other storage vessels, bowls, plates, utensils, jewelry, bricks, floor, ceiling, and wall tiles, etc. The ceramic articles can be intended for use inside a dwelling or for exterior use such as in building construction.

Glass articles include functional and decorative glass articles. Glass differs from ceramic in that ceramic is generally translucent at best where glass (unless intensely coloured) is generally transparent in thicknesses of about 0.5 mm such that size ten type can be read through glass panes under normal sunlight conditions. For the purpose of this specification, glass articles will generally have high concentrations of silica (e.g., $SiO_2$) of at least 50% by weight based on the entire glass portion of the article. Examples of glass compositions include lead-oxide glass at 59 wt. % silica, 2 wt. % $Na_2O$, 25 wt. % PbO, 12 wt. % $K_2O$, 0.4 wt. % alumina and 1.5 wt. % Zn; sodium borosilicate glass with about 81 wt. % silica, 12 wt. % $B_2O_3$, 4.5 wt. % $Na_2O$, and 2 wt. % $Al_2O_3$; soda-lime-silica window glass with about 72 wt. % silica, 14.2 wt. % $Na_2O$, 25 wt. % MgO, 10 wt. % CaO, and 0.6 wt. % $Al_2O_3$; and fused silica glass with 95+wt. % silica. Glass articles can generally include, but is not limited to, glass panes (including curved and non-flat panes), tubes, vials, bottles, beakers, flasks, glasses, cups, plates, bowls, pans, lenses, vessels, jars, spheres/balls, etc. In the past, screen printing has been used to decorate some glass containers and articles with mixed metal oxide type pigments formed into an inorganic ink. These can somewhat permanently identify the contents with source, content, or trademark identification.

The following examples provide illustrations of the invention. These examples are non-exhaustive and are not intended to limit the scope of the invention.

EXAMPLES

List of Ingredients
Carbosperse™ K752—poly acrylic acid MW 2000 63% active in water ex Lubrizol.
Carbosperse™ K732—poly acrylic acid MW 5000 50% active in water ex Lubrizol.
Poly(acrylic acid-co-maleic acid) MW 3000 50% active in water ex Sigma Aldrich.
Polyetheramine A: is a polyetheramine of MW 1650 (derived from a $C_{12-15}$ alcohol reacted with propylene oxide followed by base catalysed addition of the resultant polyether alcohol to acrylonitrile and subsequent hydrogenation to give an amine (85% active)) referred to as Polyetheramine A
Polyetheralcohol A: is a polyetheralcohol of MW1570 (derived from a $C_{12-15}$ alcohol reacted with propylene oxide) referred to as Polyetheralcohol A
Surfonamine™ B-200 ex Huntsman of 2000 g/mole molecular weight amine terminated, EO/PO of 6/29
Polyethylene glycol monomethyl ether is a polyether alcohol of MW500 (derived from methanol reacted with ethylene oxide) ex Aldrich Example 1

Carbosperse™ K752 (32.3 parts by wt.) and Polyetheramine A (119.15 parts) were heated to 80° C. under nitrogen with a condenser fitted to the reaction vessel for 1 hour. The condenser was then exchanged for a trap and the temperature increased to 130° C. for 4 hours. The temperature was then increased to 160° C. for a further 24 hours yielding a brown viscous liquid.

Example 2

Carbosperse K752 (12.8 parts) and Polyetheramine A (106.24 parts) were heated to 80° C. under nitrogen with a condenser fitted to the reaction vessel for 1 hour. The condenser was then exchanged for a trap and the temperature increased to 130° C. for 5 hours. The temperature was then increased to 160° C. for a further 16 hours yielding a brown viscous liquid.

Example 3

Carbosperse K752 (15.02 parts) and Polyetheramine A (166.23 parts) were heated to 80° C. under nitrogen with a condenser fitted to the reaction vessel for 1 hour. The condenser was then exchanged for a trap and the temperature increased to 130° C. for 5 hours. The temperature was then increased to 160° C. for a further 40 hours yielding a brown viscous liquid.

Example 4

Carbosperse K752 (36.9 parts) and Polyetheramine A (203.91 parts) were heated to 80° C. under nitrogen with a condenser fitted to the reaction vessel for 1 hour. The condenser was then exchanged for a trap and the temperature increased to 130° C. for 5 hours. The temperature was then increased to 160° C. for a further 23 hours yielding a brown liquid.

Example 5

Polyetheramine A (120.22 parts) and isopropyl alcohol (13.87 parts) were heated to 50° C. under nitrogen with a condenser fitted to the reaction vessel, Carbosperse™ K732 (27.41 parts) was then added slowly to the reaction mixture. The resulting mixture was stirred for 1 hour and then the temperature was increased to 80° C. for a further 1 hour. The condenser was then exchanged for a trap and the temperature increased to 130° C. for 3½ hours. The temperature was then increased to 160° C. for a further 18 hours yielding a dark red/brown liquid.

Example 6

Polyetheramine A (119.94 parts) and isopropyl alcohol (18.69 parts) were heated to 50° C. under nitrogen with a condenser fitted to the reaction vessel, Poly(acrylic acid-co-maleic acid) (35.69 parts) was then added slowly to the reaction mixture. The resulting mixture was stirred for 1 hour and then the temperature was increased to 80° C. for a further 1 hour. The condenser was then exchanged for a trap and the temperature increased to 130° C. for 3½ hours. The temperature was then increased to 160° C. for a further 18 hours yielding a dark red/brown liquid.

Example 7

Carbosperse K752 (24.52 parts) and Polyetheramine A (22.6 parts) Polyetheralcohol A (84.27 parts) were heated to 120° C. under nitrogen with a trap fitted to the reaction vessel for 2 hours. The temperature was then increased to 140° C. for 3 hours. The temperature was then increased to 180° C. for a further 24 hours yielding a brown liquid.

Example 8

Carbosperse K752 (125.5 parts), Polyetheramine A (669.44 parts) and Isopropyl alcohol (72 parts) were heated to 80° C. under nitrogen with a condenser fitted to the reaction vessel for 1 hour. The condenser was then exchanged for a trap and the temperature increased to 130° C. for 4½ hours. The temperature was then increased to 160° C. for a further 16½ hours yielding a dark brown liquid.

Example 9

Carbosperse K752 (19.12 parts) and Surfonamine B-200 (120.46 parts) were heated to 80° C. under nitrogen with a condenser fitted to the reaction vessel and stirred for 1 hour. The condenser was then exchanged for a trap and the temperature was increased to 130° C. for 4 hours. The temperature was then increased to 150° C. for a further 34 hours yielding a brown liquid.

Example 10

Carbosperse K752 (70.55 parts), Polyethylene glycol monomethyl ether MW500 (30.87 parts) and Polyetheramine A (450.79 parts) were heated to 120° C. under nitrogen with a condenser fitted to the reaction vessel for 1 hour. The condenser was then exchanged for a trap and the temperature increased to 130° C. for 5 hours. The temperature was then increased to 180° C. for a further 18 hours yielding a brown viscous liquid.

Comparative Milling Tests
Pigment Sicocer Yellow 2200 in Petroleum Distillates Dispersions A Dispersions are prepared by dissolving dispersants (27 parts as 100% active) in petroleum distillates (Exxsol™ D140 ex. Exxon Mobil) (243 parts). Sicocer Yellow 2200 pigment (ex. BASF) (180 parts) was added to each mixture and each were premixed using a saw tooth impeller at 2000 rpm for 30 mins. The premix was then milled using a Netzsch LAbStar/Mini Mill and a "mini" grinding chamber (0.161) under the following conditions; a 70% bead charge of 0.3-0.4 mm YTZ beads at 3000 rpm, a pump speed of 15 rpm and a mill temperature of 20-30° C. for 90 minutes. Particles sizes were obtained by taking a sample of the milling dispersion (0.04 parts) and diluting in toluene (8 parts) and measuring the particle size on a Nanotrac DLS particle size analyzer.

Pigment Sicocer Yellow 2200 in Ethylhexyl Cocoate and Isopropyl Myristate Mixture Dispersions B Dispersions are prepared by dissolving dispersants (36.05 parts as 100% active) in Crodamol OC LQ (ex. sigma Aldrich) (151.73 parts) and isopropyl myristate (ex. sigma Aldrich) (61.97 parts). Sicocer Yellow 2200 pigment (ex. BASF) (200.25 parts) was added to each mixture and each were premixed using a saw tooth impeller at 2000 rpm for 30 min. The premix was then milled using a Netzsch LAbStar/Mini Mill and a "mini" grinding chamber (0.161) under the following conditions; a 87.5% bead charge of 0.3-0.4 mm YTZ beads at 3000 rpm, a pump speed of 15 rpm and a mill temperature of 20-30° C. for 90 minutes. Particles sizes were obtained by taking a sample of the milling dispersion (0.04 parts) and diluting in toluene (8 parts) and measuring the particle size on a Nanotrac DLS particle size analyzer.

Pigment Sicocer Yellow 2200 in Dowanol TPM Dispersions C

Dispersions are prepared by dissolving dispersants (24 parts as 100% active) in Dowanol TPM (ex. Dow Chemicals) (216 parts). Sicocer Yellow 2200 pigment (ex. BASF) (160.00 parts) was added to each mixture and each were premixed using a saw tooth impeller at 2000 rpm for 30 mins. The premix was then milled using a Netzsch LAbStar/Mini Mill and a "mini" grinding chamber (0.161) under the following conditions; a 70% bead charge of 0.3-0.4 mm YTZ beads at 3000 rpm, a pump speed of 15 rpm and a mill temperature of 20-30° C. for 90 minutes. Particles sizes were obtained by taking a sample of the milling dispersion (0.04 parts) and diluting in toluene (8 parts) and measuring the particle size on a Nanotrac DLS particle size analyzer.

Pigment Sicocer F Pink 10309 in Petroleum Distillates Dispersions D

Dispersions are prepared by dissolving dispersants (28.69 parts as 100% active) in Exsol D140 (ex. ExxonMobil) (205.06 parts). Sicocer F Pink 10307 pigment (ex BASF) (191.25 parts) was added to each mixture and each were premixed using a saw tooth impeller at 2000 rpm for 60 min. The premix was then milled using a Netzsch LAbStar/Mini Mill and a "mini" grinding chamber (0.161) under the following conditions; a 70% bead charge of 0.3 0.4 mm YTZ beads at 3000 rpm, a pump speed of 15 rpm and a mill temperature of 20-30° C. for 90 minutes. Particles sizes were obtained by taking a sample of the milling dispersion (0.04 parts) and diluting in toluene (8 parts) and measuring the particle size on a Nanotrac DLS particle size analyzer.

TABLE 1

Pigment Sicocer Yellow 2200 in Exxsol D140 Dispersions A

| Agent | Viscosity cps @30 s$^{-1}$ | Viscosity cps @30 s$^{-1}$ (after 3 weeks at 40° C.) | Particle Size nm $D_{50}/D_{90}$ | Particle Size nm $D_{50}/D_{90}$ (after 3 weeks at 40° C.) |
|---|---|---|---|---|
| Dispersant Ex. 1 | 26 | 23 | 304.0/522.0 | 281.5/431.0 |
| Dispersant Ex. 2 | 17.5 | 16 | 356.0/558.0 | 271.1/461.0 |
| Dispersant Ex. 3 | 15.5 | 15 | 230.8/337.0 | 261.1/389.0 |
| Dispersant Ex. 4 | 18 | 17.5 | 275.5/458.0 | 275.3/458.0 |
| Dispersant Ex. 5 | 19 | 19.5 | 281.4/394.0 | 275.2/437.0 |
| Dispersant Ex. 6 | 19 | 15.5 | 260.3/359.0 | 245.3/396.0 |
| Dispersant Ex. 7 | 18.5 | 17 | 264.0/384.0 | 283.2/411.0 |
| Control (No Dispersant) | N/A | N/A | nm | nm |

Control failed and gelled in the milling.

TABLE 2

Pigment Sicocer Yellow 2200 in Ethylhexyl Cocoate and Isopropyl Myristate mixture Dispersions B

| Agent | Viscosity cps @30 s$^{-1}$ | Viscosity cps @30 s$^{-1}$ (after 3 weeks at 40° C.) | Particle Size nm $D_{50}/D_{90}$ | Particle Size nm $D_{50}/D_{90}$ (after 3 weeks at 40° C.) |
|---|---|---|---|---|
| Dispersant Ex. 8 | 26 | 25 | 307/493 | 289/432 |
| Dispersant Ex. 6 | 27 | 25 | 263/530 | 305/458 |
| Control (No Dispersant) | N/A | N/A | nm | nm |

Control failed and gelled in the milling.

TABLE 3

Pigment Sicocer Yellow 2200 in Dowanol TPM Dispersions C

| Agent | Viscosity cps @30 s$^{-1}$ | Viscosity cps @30 s$^{-1}$ (after 3 weeks at 40° C.) | Particle Size nm $D_{50}/D_{90}$ | Particle Size nm $D_{50}/D_{90}$ (after 3 weeks at 40° C.) |
|---|---|---|---|---|
| Dispersant Ex. 1 | 36 | 40 | 272/415 | 309/546 |
| Dispersant Ex. 9 | 44 | 40 | 340/504 | 331/487 |
| Control (No Dispersant) | N/A | N/A | nm | nm |

Control failed and gelled in the milling.

TABLE 4

Pigment Sicocer F Pink 10309 in Exxsol D140 Dispersions D

| Agent | Viscosity cps @30 s$^{-1}$ | Viscosity cps @30 s$^{-1}$ (after 3 weeks at 40° C.) | Particle Size nm $D_{50}/D_{90}$ | Particle Size nm $D_{50}/D_{90}$ (after 3 weeks at 40° C.) |
|---|---|---|---|---|
| Dispersant Ex. 10 | 15 | 19 | 293/410 | 307/466 |
| Control (No Dispersant) | N/A | N/A | nm | nm |

Control failed and gelled in the milling.

While the invention has been explained in relation to its preferred embodiments, it is to be understood that various modifications, thereof, will become apparent to those skilled in the art upon reading the specification. Therefore, it is to be understood that the invention disclosed herein is intended to cover such modifications as fall within the scope of the appended claims.

What is claimed is:

1. A pigment dispersion composition comprising:
    a) 20-79 wt. % of a continuous phase liquid organic media with less than 7 wt. % water based on the weight of the dispersion;
    b) 20-60 wt. % of a mixed metal oxide ceramic pigment in particulate form that develops its full color intensity and hue after firing at elevated temperatures; and
    c) 1-20 wt. % of a dispersant having terminal end groups and a central portion of the structure —[CH(A)-C(B)(D)]$_n$-[CR$_2$CR$_2$]$_m$—
    wherein repeat units of —[CH(A)-C(B)(D)]- and —[CR$_2$CR$_2$]— are in random or blocky order:
    n is 10-1400;
    m is 0-140;
    n is at least 10 times greater than m;
    each R is independently H or C$_1$-C$_{36}$ hydrocarbyl group that can be a cyclic; branched or non-branched alkyl, aryl, alkylaryl, or arylalkyl, that may optionally contain O, N, F, Cl and Br atoms
    A is H or B;
    B is independently E or G or —C(=O)—, wherein B can only be —C(=O)— when it is adjacent to a G group comprising an X group comprising a nitrogen atom, wherein said nitrogen atom can chemically bond to the carbon of the carbonyl to form a cyclic imide;
    D is —H or —CH$_3$ or —CH$_2$B, wherein D can only be —CH$_2$B when A is —H;
    E is an acid group selected from —CO$_2$H, —W—P(=O)—(OH)ε where ε is 1 or 2, and —W—S(=O)$_2$—OH where W independently in each repeat unit is a1) a direct link between a backbone carbon atom and the phosphorus or sulfur atom, b1) a hydrocarbylene linking group of 1-7 carbon atoms defined to optionally include ether, ester, or amide linking groups and/or hydroxyl pendant groups, or c1) a poly(C$_{2-4}$-alkyleneoxide) of up to 7 repeat units and optionally including an ether, ester, or amide linking group; wherein a proportion of the acid groups may be in the salt form, so that up to 1% by weight of the dispersant is from the counter ion of the salt, these counter ions can be metals ions including sodium, lithium, and potassium, or amines including ammonium and tri-C$_1$-C$_3$-alkanolamine;
    G is CO—X—(C$_y$H$_{2y}$O)$_t$—R';
    X is —O— or —N(H)— or —N=, wherein X can only be —N= when it is adjacent to a B group in the —C(=O)— form and the B group with the nitrogen form a cyclic imide;
    y is independently 2, 3 or 4 in each repeat unit;
    y is 2 in 30% or less of the repeat monomer units within the overall dispersant structure;
    R' is a C$_1$-C$_{36}$ hydrocarbyl group that can be a cyclic, branched or non-branched alkyl, aryl, alkylaryl, or arylalkyl;
    t is 6-67; and
    the mole % of each type of B unit, based on the total B units in the repeat units, is from 15%-60% of G units, from 10-85% of E units, and from 0%-45% of C(=O)— units.

2. The composition according to claim 1, wherein 15 mole % or more of X is either —N(H)— or —N= or mixtures of —N(H)— and —N=.

3. The composition according to claim 1, wherein less than 15 mole % of X units are mixtures of —N(H)— and —N= or y is 2 in at least 85 mole % of the repeat units of any —(C$_y$H$_{2y}$O)$_t$— chain in at least 15 mole % of G groups and the other 85 mole % or less of G groups contain a R' group that is no longer than 6 carbon atoms.

4. The composition as claimed in claim 1, wherein the particulate solid is at least one ceramic pigment of mixed metal oxides which contain a combination of two or more elements in cationic form selected from Al, Mg, Ca, Cd, Co, Cr, Fe, In, Mn, Ni, Pr, Sb, Se, Si, Sn, Ti, V, Zn and Zr.

5. A process for milling an inorganic mixed metal oxide particulate, having a dry powder volume average particle diameter D$_{50}$ in excess of 2 micron, in a continuous medium to a D$_{50}$ particle size of less than 700 nanometers, said process comprising:
    a) blending said continuous medium, said inorganic mixed metal oxide particulate, wherein said inorganic mixed metal oxide particulate is a mixed metal oxide pigment that develops its color intensity and hue after firing at elevated temperatures, optionally including a vitreous glaze material, having a dry powder volume average particle diameter in excess of 2 micron, and a dispersing agent having terminal end groups and a central portion of the structure —[CH(A)-C(B)(D)]$_n$-[CR$_2$CR$_2$]$_m$—
    wherein repeat units of —[CH(A)-C(B)(D)]- and —[CR$_2$CR$_2$]— are in random or blocky order:
    n is 10-1400;
    m is 0-140;
    n is at least 10 times greater than m;
    each R is independently H or C$_1$-C$_{36}$ hydrocarbyl group that can be a cyclic; branched or non-branched alkyl, aryl, alkylaryl, or arylalkyl, that may optionally contain O, N, F, Cl, and/or Br atoms;
    A is H or B;
    B is independently E or G or —C(=O)—, wherein B can only be —C(=O)— when it is adjacent to a G group comprising an X group comprising a nitrogen atom, wherein said nitrogen atom can chemically bond to the carbon of the carbonyl to form a cyclic imide;
    D is —H or —CH$_3$ or —CH$_2$B, wherein D can only be —CH$_2$B when A is —H;
    E is an acid group selected from —CO$_2$H, —W—P(=O)—(OH)ε where ε is 1 or 2, and —W—S(=O)$_2$—OH where W independently in each repeat unit is a1) a direct link between a backbone carbon atom and the phosphorus or sulfur atom, b1) a hydrocarbylene linking group of 1-7 carbon atoms defined to optionally include ether, ester, or amide linking groups and/or hydroxyl pendant groups, or c1) a poly($C_{2-4}$-alkyleneoxide) of up to 7 repeat units and optionally including an ether, ester, or amide linking group; wherein a proportion of the acid groups may be in the salt form, so that up to 1% by weight of the dispersant is from the counter ion of the salt, these counter ions can be metals ions including lithium, sodium and potassium, or amines including ammonium and tri-$C_1$-$C_3$-alkanolamine;

G is CO—X—$(C_yH_{2y}O)_t$—R';

X is —O— or —N(H)— or —N=, wherein X can only be —N= when it is adjacent to a B group in the —C(=O)— form and the B group with the nitrogen form a cyclic imide;

y is independently 2, 3 or 4 in each repeat unit;

y is 2 in 30% or less of the repeat $(C_yH_{2y}O)$— units in G, within the overall dispersant structure;

R' is a $C_1$-$C_{36}$ hydrocarbyl group that can be a cyclic, branched or non-branched alkyl, aryl, alkylaryl, or arylalkyl;

t is 6-67;

the mole % based on the total B units in the repeat units, is from 15%-60% of G units, from 10-85% of E units, and from 0%-45% of C(=O)— units;

milling said mixed metal oxide pigment dispersed with said dispersing agent in said continuous medium using a bead mill for 5 minutes to 60 hours forming a dispersion of said mixed metal oxide in said continuous medium; and confirming the volume average particle diameter $D_{50}$ is less than 700 nanometers.

6. The process according to claim 5, wherein said mixed metal oxide pigment contains a combination of two or more different elements in the form of cations selected from the group of Al, Mg, Ca, Cd, Co, Cr, Fe, In, Mn, Ni, Pr, Sb, Se, Si, Sn, Ti, V, Zn and Zr.

7. The process of claim 5, wherein the continuous media comprises less than 7 wt. % water based on the weight of the dispersion.

8. The process of claim 7, wherein the continuous media comprises an organic solvent with less than 5 wt. % water based on the weight of the dispersion.

9. The process of claim 5, wherein 15 mole % or more of X is either —N(H)— or —N= or mixtures of —N(H)— and —N=.

10. The process of claim 5, wherein less than 15 mole % of X units are mixtures of —N(H)— and —N= or y is 2 in at least 85 mole % of the repeat units of any —$(C_yH_{2y}O)_t$— chain in at least 15 mole % of G groups and the other 85 mole % or less of G groups contain a R' group that is no longer than 6 carbon atoms.

11. A process for digitally printing on ceramic article or glass article substrate using an ink jetted through a nozzle, comprising, a) providing a mixed metal oxide dispersed in a continuous medium with a dispersing agent having terminal end groups and a central portion of the structure —[CH(A)-C(B)(D)]$_n$-[CR$_2$CR$_2$]$_m$—;

b) jetting said mixed metal oxide dispersed in said continuous medium using said dispersing agent onto said substrate to form a pigmented digital image (optionally on a pre-glaze layer(s) on a ceramic surface), wherein said pigmented digital image on said substrate develops into a colored image upon firing said ceramic substrate or heating said glass substrate to provide tempering or annealing;

c) optionally applying a glaze over said digital image; and d) heating said ceramic article at an elevated temperature or heating said glass article to anneal or temper it, wherein said image from mixed metal oxide develops optimal color intensity upon heating to its color;

wherein repeat units of —[CH(A)-C(B)(D)]- and —[CR$_2$CR$_2$]— are in random or blocky order:

n is 10-1400;

m is 0-140;

n is at least 10 times greater than m;

each R is independently H or $C_1$-$C_{36}$ hydrocarbyl group that can be a cyclic; branched or non-branched alkyl, aryl, alkylaryl, or arylalkyl, that may optionally contain O, N, F, Cl, and/or Br atoms;

A is H or B;

B is independently E or G or —C(=O)—, wherein B can only be —C(=O)— when it is adjacent to a G group comprising an X group comprising a nitrogen atom, wherein said nitrogen atom can chemically bond to the carbon of the carbonyl to form a cyclic imide;

D is —H or —$CH_3$ or —$CH_2$B, wherein D can only be —$CH_2$B when A is —H;

E is an acid group selected from —$CO_2$H, —W—P(=O)—(OH)ε where ε is 1 or 2, and —W—S(=O)$_2$—OH where W independently in each repeat unit is a1) a direct link between a backbone carbon atom and the phosphorus or sulfur atom, b1) a hydrocarbylene linking group of 1-7 carbon atoms defined to optionally include ether, ester, or amide linking groups and/or hydroxyl pendant groups, or c1) a poly($C_{2-4}$-alkyleneoxide) of up to 7 repeat units and optionally including an ether, ester, or amide linking group; wherein a proportion of the acid groups may be in the salt form, so that up to 1% by weight of the dispersant is from the counter ion of the salt, these counter ions can be metals ions including lithium, sodium and potassium, or amines including ammonium and tri-$C_1$-$C_3$-alkanolamine;

G is CO—X—$(C_yH_{2y}O)_t$—R';

X is —O— or —N(H)— or —N=, wherein X can only be —N= when it is adjacent to a B group in the —C(=O)— form and the B group with the nitrogen form a cyclic imide;

y is independently 2, 3 or 4 in each repeat unit;

y is 2 in 30% or less of the repeat —$(C_yH_{2y}O)$— units within the overall dispersant structure;

R' is a $C_1$-$C_{36}$ hydrocarbyl group that can be a cyclic, branched or non-branched alkyl, aryl, alkylaryl, or arylalkyl;

t is 6-67; and the mole % of each type of B units, based on the total B units in the repeat units, is from 15%-60% of G units, from 10-85% of E units, and from 0%-45% of C(=O)— units.

12. The process of claim 11, wherein the mixed metal oxide pigment develops its color intensity and hue after firing at 600° C. or above for a ceramic substrate or 400° C. or above for a glass substrate.

13. The process of claim 11, wherein said mixed metal oxide is at least one ceramic pigment of mixed metal oxides which contain a combination of two or more elements in cationic form selected from the group of Al, Mg, Ca, Cd, Co, Cr, Fe, In, Mn, Ni, Pr, Sb, Se, Si, Sn, Ti, V, Zn and Zr.

14. The process of claim 11, wherein 15 mole % or more of X is either —N(H)— or —N= or mixtures of —N(H)— and —N=.

15. The process of claim 11, wherein less than 15 mole % of X units are mixtures of —N(H)— and —N= or y is 2 in at least 85 mole % of the repeat units of any —($C_yH_{2y}O$)$_t$— chain in at least 15 mole % of G groups and the other 85 mole % or less of G groups contain a R' group that is no longer than 6 carbon atoms.

16. The pigment dispersion composition of claim 1, wherein n is from 10 to 140;
m is from 0 to 14;
each R is independently H or $C_1$-$C_{18}$ hydrocarbyl group;
R' is a $C_1$-$C_{18}$ hydrocarbyl group;
t is 6-45;
y is 2 in 22% or less of the repeat monomer units; and
said ceramic pigment of mixed metal oxides contains a combination of two or more elements in cationic form selected from the group consisting of Al, Ca, Co, Cr, Fe, Mn, Pr, Sb, Si, Sn, Ti, Zn and Zr.

17. The process for milling an inorganic mixed metal oxide particulate of claim 5, wherein n is from 10 to 140;
m is from 0 to 14;
each R is independently H or $C_1$-$C_{18}$ hydrocarbyl group;
R' is a $C_1$-$C_{18}$ hydrocarbyl group;
t is 6-45;
y is 2 in 22% or less of the repeat monomer units; and
said ceramic pigment of mixed metal oxides contains a combination of two or more elements in cationic form selected from the group consisting of Al, Ca, Co, Cr, Fe, Mn, Pr, Sb, Si, Sn, Ti, Zn and Zr.

18. The process for digitally printing on ceramic article or glass article substrate using an ink jetted through a nozzle of claim 11, wherein n is from 10 to 140;
m is from 0 to 14;
each R is independently H or $C_1$-$C_{18}$ hydrocarbyl group;
R' is a $C_1$-$C_{18}$ hydrocarbyl group;
t is 6-45;
y is 2 in 22% or less of the repeat monomer units; and
said ceramic pigment of mixed metal oxides contains a combination of two or more elements in cationic form selected from the group consisting of Al, Ca, Co, Cr, Fe, Mn, Pr, Sb, Si, Sn, Ti, Zn and Zr.

* * * * *